Figure 4:
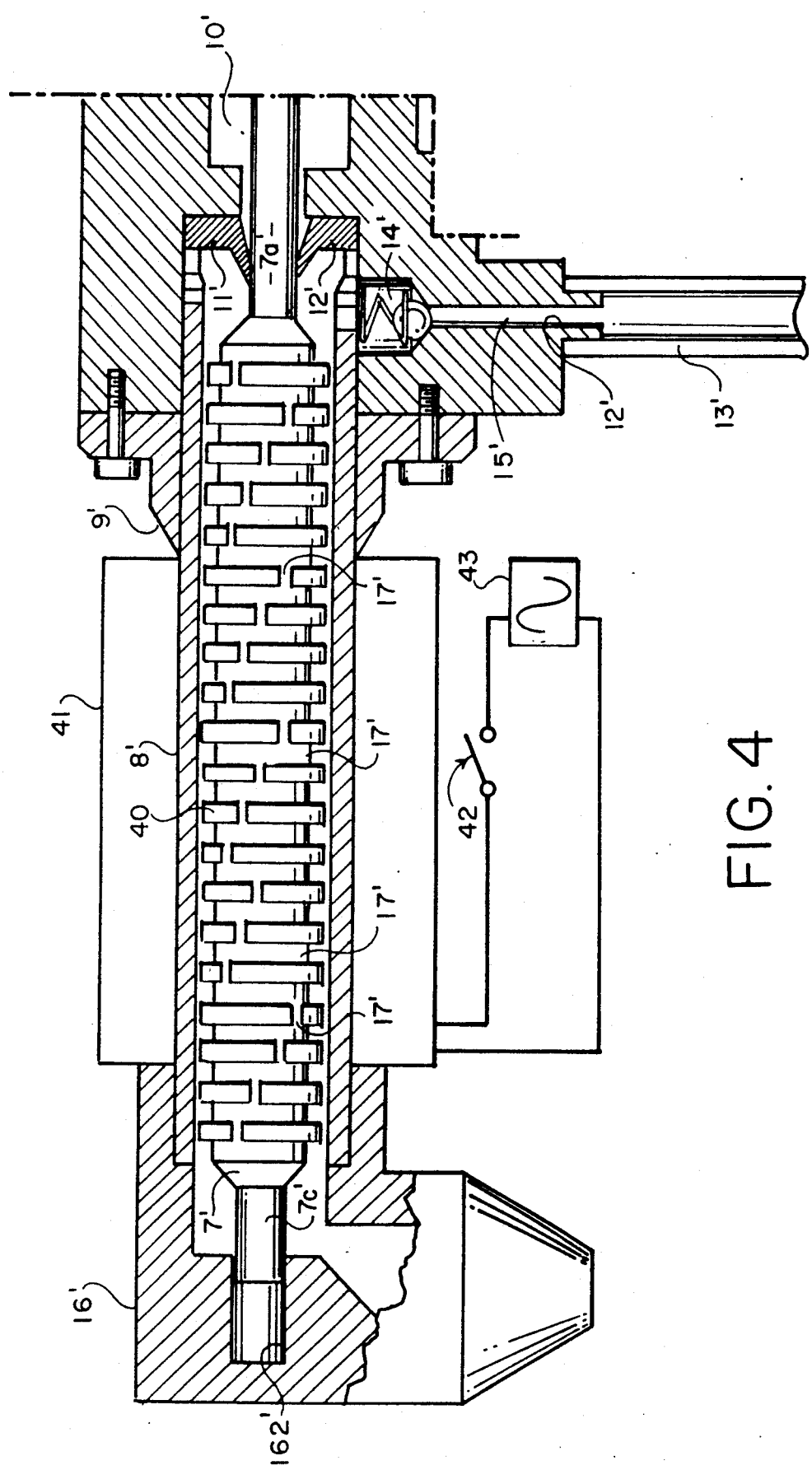

United States Patent [19]

Passoni

[11] Patent Number: 5,089,178
[45] Date of Patent: Feb. 18, 1992

[54] HOUSEHOLD APPARATUS FOR WHIPPING CREAM

[76] Inventor: Gianfranco Passoni, Turnweg 27b, Bern, Switzerland, CH-3001

[21] Appl. No.: 353,628

[22] PCT Filed: Jun. 21, 1988

[86] PCT No.: PCT/CH88/00110

§ 371 Date: Apr. 6, 1989

§ 102(e) Date: Apr. 6, 1989

[87] PCT Pub. No.: WO88/10085

PCT Pub. Date: Dec. 29, 1988

[30] Foreign Application Priority Data

Jun. 22, 1987 [CH] Switzerland .................. 2348/87

[51] Int. Cl.$^5$ ............................................. B01F 3/04
[52] U.S. Cl. .................................... 261/59; 261/82;
261/DIG. 16; 366/102; 366/258; 366/332
[58] Field of Search ................ 261/DIG. 16, 59, 82;
366/102, 255, 256, 258, 332, 333

[56] References Cited

U.S. PATENT DOCUMENTS

| | | | |
|---|---|---|---|
| 1,489,956 | 4/1924 | Mason | 366/258 |
| 1,988,542 | 1/1935 | Coleman et al. | 366/258 |
| 2,513,577 | 7/1950 | Malme | 366/256 |
| 2,661,938 | 12/1953 | Kuentzel | 366/332 |
| 3,332,669 | 7/1967 | Colonna | 366/258 |
| 3,715,105 | 2/1973 | Griffin | 366/332 |
| 3,758,080 | 9/1973 | MacManns | 261/DIG. 16 |
| 3,855,368 | 12/1974 | Prochazka et al. | 366/332 |
| 4,144,293 | 3/1979 | Hamoto et al. | 261/DIG. 16 |
| 4,737,349 | 4/1988 | Arnold et al. | 366/332 |
| 4,816,190 | 3/1989 | Kirchler | 261/DIG. 16 |

FOREIGN PATENT DOCUMENTS

| | | | |
|---|---|---|---|
| 643808 | 9/1928 | France | 261/DIG. 16 |
| 397621 | 8/1933 | United Kingdom | 261/DIG. 16 |

*Primary Examiner*—Tim Miles
*Attorney, Agent, or Firm*—H. Jay Spiegel

[57] ABSTRACT

In order to whip liquid cream even in reduced quantities, without any effort and risk, the apparatus according to the invention comprises a piston (7) provided in its front part (7b) with holes (17) through which a mixture of cream and air is pumped by jerky motions which whip the cream progressively as it moves towards a nozzle (16) dispensing the whipped cream. The rear part (7a) of the piston (7) operates with an excentric (4) actuated by a electric motor (2) and exerts oscillations along its longitudinal axis, thus modifying constantly the empty space in a tube (8) surrounding the piston (7). This modification of volume creates a sucking action on the liquid cream to which air is mixed and, at the same time, pumps said mixture by jerky motions towards the nozzle (16) through the holes (17).

12 Claims, 2 Drawing Sheets

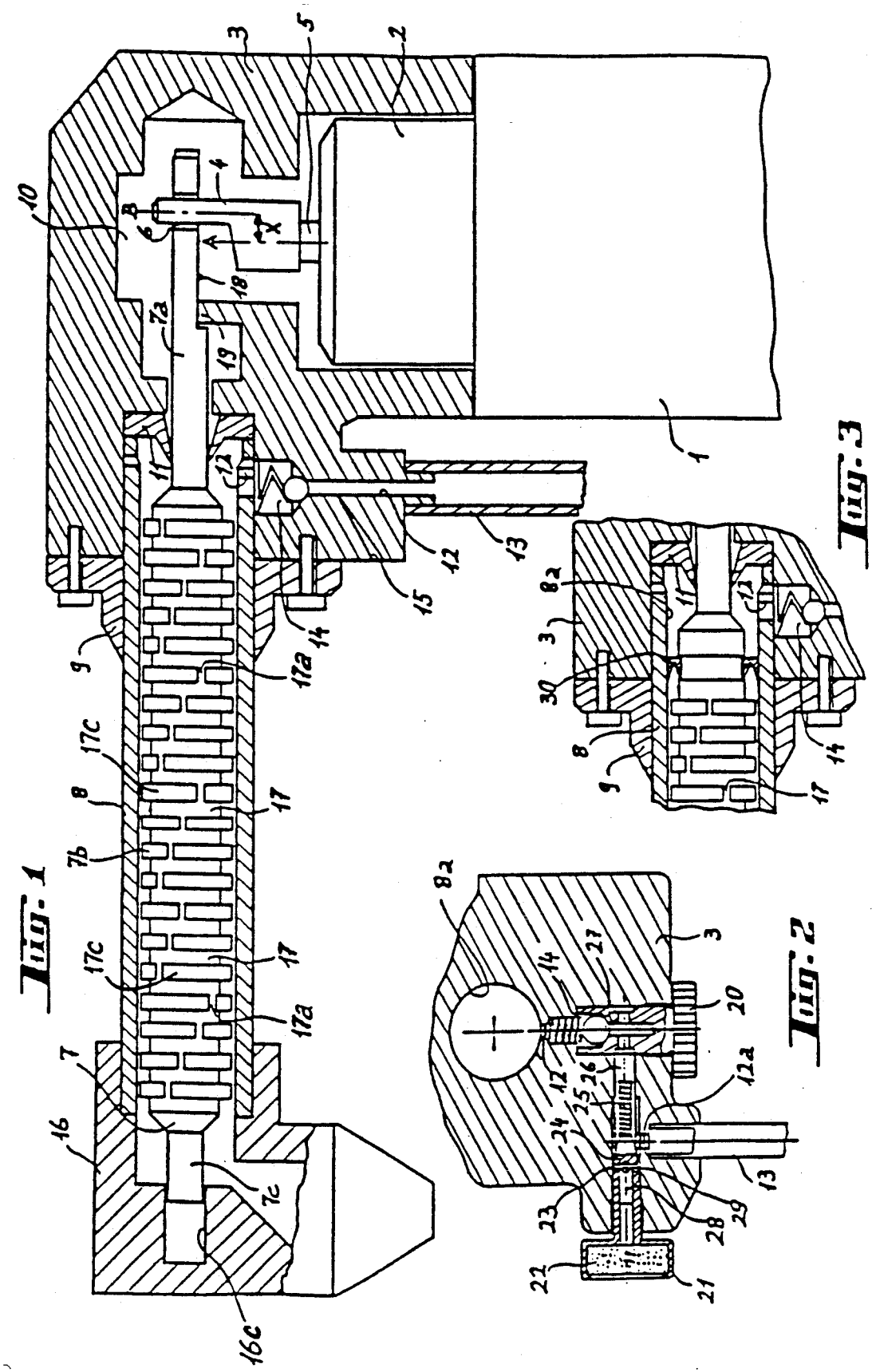

HOUSEHOLD APPARATUS FOR WHIPPING CREAM

The present invention relates to a household apparatus for whipping cream, according to the preamble of claim 1.

Several methods and devices for whipping cream are known. One of the oldest methods is to whip the liquid cream by hand, in a bucket, by means of a whisk. Another well-known process is to place the liquid cream in a sealed receptacle and to inject laughing gas, or another gas, into it under pressure. In gastronomy, special machines are also used to whip cream, machines which add ambient air to the liquid cream, preferably by jerky movements, while pressing this mixture through a conduit occupied by obstacles, forcing the mixture of cream and air to change its direction very rapidly and to flow through a long path, before ending up at a distribution nozzle, from which the whipped cream emerges.

All these known processes present disadvantages, either that they are tiring, or difficult to practice, or further that they are only usable if large quantities of cream are used. Moreover, the machines used in gastronomy for these purposes do not lend themselves to household use, since they are too large and heavy and too expensive for very limited use.

The object of the present invention is to provide a household apparatus which permits even limited quantities of cream to be whipped without problems, and is easy to use.

According to the invention, this object is attained by an apparatus as defined in claim 1. In the following, advantageous embodiments of such an apparatus will be described with reference to the drawings, which show:

in FIG. 1, a partial cross-section through part of a first embodiment of such an apparatus;

in FIG. 2, a cross-section through part of a second embodiment of such an apparatus; and in FIG. 3, a cross-section through part of a third embodiment of such an apparatus.

in FIG. 4, a cross-section through part of a fourth embodiment of such an apparatus.

In FIG. 1, is seen part of a base 1 comprising, inter alia, an electric motor 2, as well as a base plate of the apparatus, not shown. On this base can be mounted an upper part 3 of the apparatus, including, within a rear chamber 10, an eccentric 4, preferably mounted retractably on an axle 5 of the electric motor 2, and being engageable within a transverse oval slot 6 disposed in the rear part 7a of a piston 7, whose middle part 7b is accommodated in a tube 8. The latter can be fixed on the upper part 3, preferably by means of a collar 9 solidly attached to the tube 8. The rear chamber 10, into which the rear part of the piston 7 penetrates, is preferably separated from the empty volume of the tube 8 by a lip gasket 11 bearing on the piston 7. A passage 12 opens into the empty volume of the tube 8, connecting it to a vertical pipe 13 which can be submerged within the liquid cream in a receptacle, not shown, which is placed on the base plate of the apparatus. Within the passage 12 is preferably inserted a ball valve 14, which serves to prevent the liquid cream, once it has been drawn into the free volume of the tube 8, from being driven back. A taphole 15 opens into the passage 12, operating according to the Venturi principle, and serving to draw air into the liquid cream as it rises through the passage 12, ending up within the free volume of the tube 8. Due to the fact that the piston 7 is oscillated along its longitudinal axis by the eccentric 4 actuated by the electric motor 2, a suction is applied to the passage 12. This oscillation of the piston 7 within the tube 8 creates a piston-pumping effect, since it constantly changes the empty volume within the tube 8, between the gasket 11 and the middle part 7b of the piston 7, that is, it expands at the moment the piston 7 is moved to the left, in the drawing, and is compressed at the moment the piston is displaced toward the right, in the drawing, respectively. When the empty volume is expanding, the resultant suction draws liquid cream and air through the passage 12. Since the ball valve 14 closes the passage 12 when the empty space is being compressed, it is impossible for the cream/air mixture to be driven back through the passage 12. Therefore, this mixture is displaced in the direction of a nozzle 16 mounted on the front end of the tube 8, the mixture passing through cutouts 17 and short passages 17a formed in lands 17c separating adjacent cutouts 17 arranged in the middle part 7b of the piston 7. Thus, the oscillation of the piston 7 serves to pump cream mixed with air from the passage 12 to the nozzle 16. The displacement of this mixture is carried out by jerky movements which whip the cream little by little, such that at the instant it exits from the nozzle 16, it is completely whipped.

Preferably, the nozzle 16 has a taphole 16a in which the front part 7c of the piston 7 can be guided.

Depending on the speed of rotation of the axle 5 of the electric motor 2, an interaxis distance X of from 1 to 2 millimeters, between the central axis A of the axle 5 and the central axis B of the eccentric 4, is sufficient to ensure a regular flow of whipped cream to the nozzle 16.

It is advantageous if the upper part 3 of the apparatus can be detached easily from the base 1, for example by means of a bayonet coupling, in order to permit simple and rapid cleaning of the piston 7, the tube 8, and the nozzle 16 after use of the apparatus. The nozzle 16, which preferably is only wedged onto the tube 8, is also detachable, such that the piston 7 can be removed form the tube 8 toward the front. Thus, all the pieces that can come into contact with the cream can be accessed easily. After they are cleaned, these pieces are again assembled and the upper part 3 of the apparatus is remounted on the base 1. In order to ensure correct placement of the piston 7 in the tube 8, such that the eccentric 4 can engage within the oval slot 6, the rear part 7a of the piston 7 is preferably provided with a flat portion 18 cooperating, for this purpose, with a toe 19 formed within the upper part 3.

In FIG. 2 is seen a more sophisticated construction of the air inlet into the vertical passage 12. In this modified embodiment of the apparatus, a horizontal taphole 26 is provided which ends in a part 27 of the passage 12 which is located beneath the ball valve 14, the latter being preferably mounted within a screw 20. Into the taphole 26 is screwed a piece including in its exterior part 21 an air filter 22. Through the air filter, and further via a passage 28, tapholes 29 and cutouts 23, the air is drawn into the taphole 26. A cone 24, formed on this piece, serves in cooperation with the wall of the taphole 26, as a regulator of the volume of air drawn in. The lower part 12a of the vertical cream passage is located at the upper end of the pipe 13 and opens immediately following the cone 24 into the taphole 26. In the latter, preferably, a screw part 25 of the aforementioned piece is also accommodated. The mixture of cream and air penetrates, at the exit of the passage 12, into a passage 8a formed either by the tube 8 (FIG. 1), or by the upper part 3 of the apparatus.

This construction of the air intake passage permits the volume of air mixed with the liquid cream to be regulated at will, such that the consistency of the whipped cream can be regulated.

In FIG. 3 is illustrated a third embodiment of the apparatus according to the invention, according to which a second lip gasket 30 is provided between the rear part 7a of the piston and its middle part 7b. This gasket, mounted on the piston 7, applies the suction force exerted by the oscillation of the piston 7 on the cream/air mixture within the passage 12, and also increases in volume the advancing movement of this mixture during its displacement toward the nozzle 16.

To make the construction of the apparatus simple and inexpensive, in a particular embodiment of the invention, the piston 7 can be arranged to slide, with minimal play, directly within the tube 8.

The vertical pipe can preferably be made of a flexible material, such that receptacles of various dimensions can be used as "reservoirs" for the liquid cream.

In still another embodiment of the apparatus according to the invention with reference to FIG. 4, the electric motor and the eccentric can be replaced, as the actuating elements, by a steel bar accommodated within the piston and a solenoid placed around the tube 8, which are actuated so that magnetic fields in alternating directions are created, such that the piston is oscillated.

Referring to FIG. 4, wherein like elements from FIG. 1 are designated by like primed reference numerals, the middle part of the piston 7' is made of a magnetically attractive material such as, for example, steel. A solenoid 41 is mounted about tube 8' and is connected to a source 43 of Alternating Current via control switch 42. When the control switch 42 is closed, Alternating Current is applied to solenoid 41 causing a magnetic field to be created which rapidly reverses direction. The magnetically attractive material of the piston 40 causes the piston 40 to rapidly oscillate back and forth, thus causing whipping of the cream in the same manner as is the case through operation of the motor 2, cam 4 and slot 6 in the embodiment best illustrated in FIG. 1.

Of course, it is possible to combine the different variations of the apparatus according to the invention described hereinabove, in order to obtain different forms of the apparatus. Other modifications can also be applied to the construction of this apparatus.

One skilled in the art easily recognizes that the apparatus according to the invention is inexpensive to manufacture and permits, without more, even very limited quantities of liquid cream to be whipped, without substantial waste. Since this apparatus can be handled very easily and without any danger, it lends itself well to use in all household kitchens.

I claim:

1. Household apparatus for whipping cream, comprising a base (1) and a system of passages (12) and cutouts (17), through which a mixture of cream and air is pumped, said cutouts (17) being formed in an external face of a piston (7) mounted for oscillation along a longitudinal axis thereof and being slidably mounted within a tube (8) between a cream and air inlet and an outlet, said cutouts being separated from one another by lands of said piston which slidably engage said tube, said lands having short passages fluidly connecting adjacent cutouts such that within the tube (8), oscillations of said piston cause a drawing-in action from said inlet followed by a compression action toward said outlet, whereby a mixture of cream and air may be drawn through said inlet and pumped through the cutouts (17) and short passages, in order to progressively whip the cream in the direction of a nozzle (16) at said outlet for delivery of the whipped cream.

2. Apparatus according to claim 1, characterized in that it comprises, within the passage (12) through which the mixture of cream and air is drawn, a ball valve (14) preventing the cream/air mixture from being driven back when the empty volume within the tube (8) is compressed by oscillation of said piston.

3. Apparatus according to claim 1, characterized in that the piston (7) comprises a steel bar and is oscillated by a magnetic solenoid disposed around the tube (8), and actuated so as to create a magnetic field whose direction alternates.

4. Apparatus according to claim 1, characterized in that the piston (7) is provided with a peripheral lip gasket (30) serving to support action of drawing in and homogenizing the mixture of liquid cream and air.

5. Apparatus according to claim 1 further comprising a throttle, within a taphole (15) serving as a conduit for air to the passage (12), permitting the volume of air mixed with the liquid cream to be regulated.

6. Apparatus according to claim 5, characterized in that it comprises, within the throttle, an air filter (22).

7. Apparatus according to claim 1, characterized in that oscillation of said piston is carried out by an electric motor (2) which supports, on its axle (A), an eccentric (4) which cooperates with a rear part (7a) of the piston (7) in order to cause the latter to oscillate.

8. Apparatus according to claim 7 characterized in that said eccentric (4) is retractable, such that it is engaged automatically within an oval slot (6) arranged in said rear part (7a) of the piston (7), when it passes beneath this slot at the moment the electric motor is started up.

9. Apparatus according to claim 7 characterized in that the rear part (7a) of the piston (7) is provided with a flat portion (18) which cooperates with a toe (19), so as to guarantee correct positioning of the piston (7) when the apparatus is assembled.

10. Household apparatus for whipping cream, comprising a base and a system of passages and cutouts through which a mixture of cream and air is pumped, said cutouts being formed in a piston mounted for oscillation along a longitudinal axis thereof and being slidably mounted within a tube between an inlet and an outlet, such that within the tube, oscillations of said piston cause a drawing-in action from said inlet followed by a compression action toward said outlet, whereby a mixture of cream and air may be drawn through said inlet and pumped through the cutouts, in order to progressively whip the cream in the direction of a nozzle at said outlet for delivery of the whipped cream, oscillation of said piston being carried out by an electric motor which supports, on an axle thereof, an eccentric which cooperates with a rear part of the piston in order to cause the piston to oscillate, said eccentric being retractable, such that said eccentric is engaged automatically within an oval slot arranged in said rear part of said piston when it passes beneath said slot at the moment the electric motor is started up.

11. Household apparatus for whipping cream, comprising a base and a system of passages and cutouts through which a mixture of cream and air is pumped, said cutouts being formed in a piston mounted for oscillation along a longitudinal axis thereof and being slidably mounted within a tube between an inlet and an outlet, such that within the tube, oscillations of said piston cause a drawing-in action from said inlet followed by a compression action toward said outlet, whereby a mixture of cream and air may be drawn through said inlet and pumped through the cutouts, in order to progressively whip the cream in the direction of a nozzle at said outlet for delivery of the whipped cream, oscillation of said piston being carried out by an electric motor which supports, on an axle thereof, an eccentric which cooperates with a rear part of the piston in order to cause the piston to oscillate, said rear part of said piston being provided with a flat portion which cooperates with a toe so as to guarantee correct positioning of said piston when said apparatus is assembled.

12. Household apparatus for whipping cream, comprising a base and a system of passages and cutouts through which a mixture of cream and air is pumped, said cutouts being formed in a piston mounted for oscillation along a longitudinal axis thereof and being slidably mounted within a tube between an inlet and an outlet, such that within the tube, oscillations of said piston cause a drawing-in action from said inlet followed by a compression action toward said outlet, whereby a mixture of cream and air may be drawn through said inlet and pumped through the cutouts, in order to progressively whip the cream in the direction of a nozzle at said outlet for delivery of the whipped cream, characterized in that said piston being provided with a peripheral lip gasket serving to support action of drawing-in and homogenizing a mixture of liquid cream and air.

* * * * *